United States Patent [19]

Kojima et al.

[11] Patent Number: 4,719,072
[45] Date of Patent: Jan. 12, 1988

[54] METHOD FOR DISPOSING INNER INSERT IN BLOW MOLDING

[75] Inventors: Kinshiro Kojima, Kawasaki; Akira Iwawaki; Yoshiharu Shitara, both of Yokohama, all of Japan

[73] Assignee: Ishikawajima-Harima Jukogyo Kabushiki Kaisha, Japan

[21] Appl. No.: 854,894

[22] Filed: Apr. 23, 1986

[51] Int. Cl.$^4$ .................. B29C 49/20; B29C 49/30
[52] U.S. Cl. .................... 264/515; 264/516; 425/503; 425/525
[58] Field of Search ............... 264/515, 516; 425/503, 425/525

[56] References Cited

U.S. PATENT DOCUMENTS

| 3,575,949 | 4/1971 | Humphrey | 264/516 |
| 3,919,373 | 11/1975 | Kormendi | 264/516 |
| 4,215,089 | 7/1980 | Uhlig et al. | 264/516 |
| 4,307,059 | 12/1981 | Cambio | 264/516 |

FOREIGN PATENT DOCUMENTS

| 1930948 | 12/1970 | Fed. Rep. of Germany | 264/515 |
| 3042926 | 6/1982 | Fed. Rep. of Germany | 264/516 |
| 0025380 | 2/1980 | Japan | 264/516 |
| 0105539 | 8/1980 | Japan | 264/516 |
| 0002728 | 1/1982 | Japan | 264/516 |
| 0125633 | 7/1985 | Japan | 264/516 |
| 0234823 | 11/1985 | Japan | 264/515 |

Primary Examiner—Jan H. Silbaugh
Assistant Examiner—Neil Michael McCarthy

[57] ABSTRACT

In disposing an insert or inserts within a blow-molded product, before the blow molding step is started, an inner supporting device supporting the insert at an end thereof is inserted into a parison and then the mold is closed so that the insert is made into contact with the parison. Thereafter the blow molding is effected so that the insert is securely welded to the parison.

4 Claims, 9 Drawing Figures

METHOD FOR DISPOSING INNER INSERT IN BLOW MOLDING

BACKGROUND OF THE INVENTION

The present invention relates to a method for disposing an inner insert or inserts in blow molding and more particularly a method for mounting a molded insert or inserts on the inner wall of a product when the latter is being shaped by blow molding.

In disposing inserts onto a product which is being shaped by blow molding, the molded inserts of material capable of being welded to a plastic parison are pressed against the parison under the pressure of 2-10 kg/cm² until the molded inserts and parison are cooled to solidify. In the case of an outer insert to be disposed on the outer wall surface of a parison in blow molding, the insert is disposed in position on the cavity of a mold so that the parison is caused to be pressed against the outer insert under a blowing pressure, whereby the outer insert is easily disposed in position. However, as to an inner insert to be placed within a parison, no effective means has been proposed for holding a device adapted to press the inner insert to a parison. Even when an inner insert is attached to the inner wall surface of a parison by virtue of an adhesive tape, it is impossible to keep the inner insert in position during blow molding since no force is available for keeping the inner insert in position. Thus, hitherto, it is impossible to dispose an inner insert or inserts in position within the parison.

A conventional countermeasure in this respect is as follows. In blow molding of for instance a gasoline tank made of plastic material and in which a reservoir or chamber for gasoline is defined, the tank main body is blow-molded and then is removed from a mold. An opening greater than 150 mm in diameter is formed through the upper wall of the molded main body and a reservoir or chamber is placed through this opening into the main body. Such process requires a further step for securely disposing the reservoir in the main body by an ultrasonic welding technique. Moreover, the opening thus formed and large in diameter is difficult to seal and will cause the reduction in strength of the gasoline tank.

In view of the above, the present invention has for its object to provide a method for disposing an inner insert or inserts in blow molding which permits the welding or attachment of the inner insert to a main body during blow molding so that the quality of a molded product can be considerably improved and further fabrication steps required after the blow molding step can be substantially eliminated, whereby costs of molded products can be decreased. No separate storage of inner inserts is needed during blow molding so that not only a space for storage but also a working space can be remarkably reduced.

SUMMARY OF THE INVENTION

To attain the above and other objects, the present invention proposes that, in blow molding a product with a molded insert or inserts attached to the inner wall surface thereof, the inner insert or inserts are supported by one end or both ends of an inner supporting device which is adapted to be received in a parison and is extendable beyond the width of the product to be blow-molded. The inner supporting device is maintained in position within the parison by an outer supporting device which in turn is inserted into the parison through an opening thereof. Thereafter the mold halves are closed to clamp the parison between the cavity surface of the mold. When the parison is made into contact with the inner insert, the outer supporting device is disengaged from the inner supporting device and moved out of the mold. After the mold has been closed, blow molding is carried out so that the inner insert is welded to the blow-molded product.

The above and other objects, effects, features and advantages of the present invention will become more apparent from the description of preferred embodiments thereof taken in conjunction with the accompanying drawings.

DETAILED DESCRIPTION OF THE PREFERRED EMBODIMENTS

Figure 1:
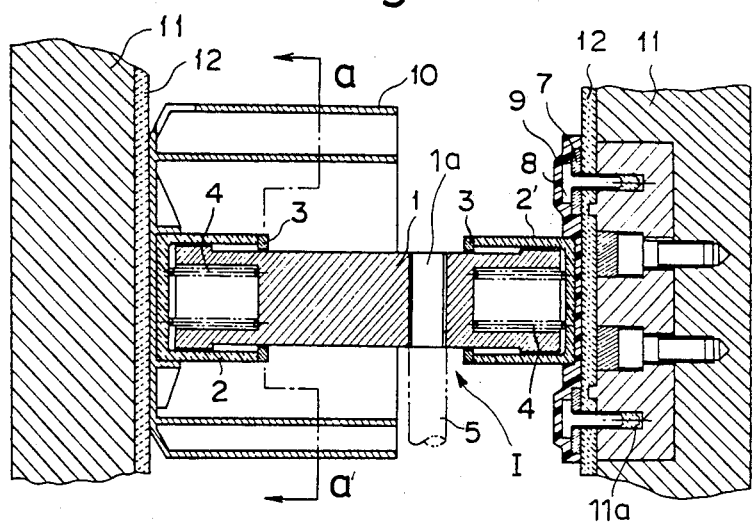
FIG. 1 is a sectional view of a preferred embodiment of the present invention illustrating that inserts supported by the ends of an inner supporting device are pressed upon the inner wall surface of a molded product.
Figure 2:
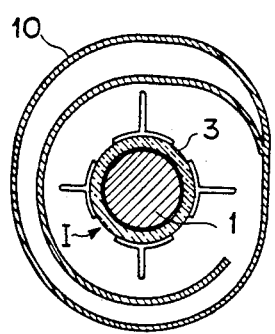
FIG. 2 is a sectional view taken along the line a—a' of FIG. 1.

FIGS. 1-3 show a first embodiment of the present invention applied to blow molding of a gasoline tank having a reservoir or chamber therein. Used are an inner supporting device I adapted to support within a mold 11 an inner insert which is a molded product in the form of a reservoir or chamber 10 as well as an outer supporting device II adapted to support the inner supporting device I from the exterior of the mold 11. In use, the inner supporting device I which supports the insert is supported by the outer supporting device II and is located within a parison.

As best shown in FIG. 1, the inner supporting device I comprises a bar-shaped chamber holder 1, slide caps 2 and 2' slidably fitted over the both ends of the chamber holder 1, stoppers 3 for preventing the slide caps 2 and 2' from being pulled out of the chamber holder 1, and springs 4 interposed between the ends of the chamber holder 1 and the slide caps 2 and 2' so that the slide caps 2 and 2' are normally biased outwardly. The inner supporting device I is extendable since the slide caps 2 and 2' are slidable outwardly at the respective ends of the chamber holder 1. The chamber holder 1 has an engaging hole 1a which is perpendicular to the axis of the chamber holder 1 and into which is fitted the leading end of a supporting rod 5 of the outer supporting device II. As best shown in FIG. 3, the outer supporting device II comprises the supporting rod 5 and a cylinder 6 adapted to cause the supporting rod 5 to extend or retract in the axial direction thereof.

The supporting rod 5 of the outer supporting device II is extended upwardly through the lower end of the mold 11 and made into engagement with the engaging hole 1a of the chamber holder 1 so that the latter is supported by the outer supporting device II in the form of a letter T. An insert or chamber 10 is supported at one end of the chamber holder 1 and another insert or insert ring 7, bolts 8 and molded plastic insert 9, at the other end of the chamber holder 1.

Figures 3A, 3B, 3C:
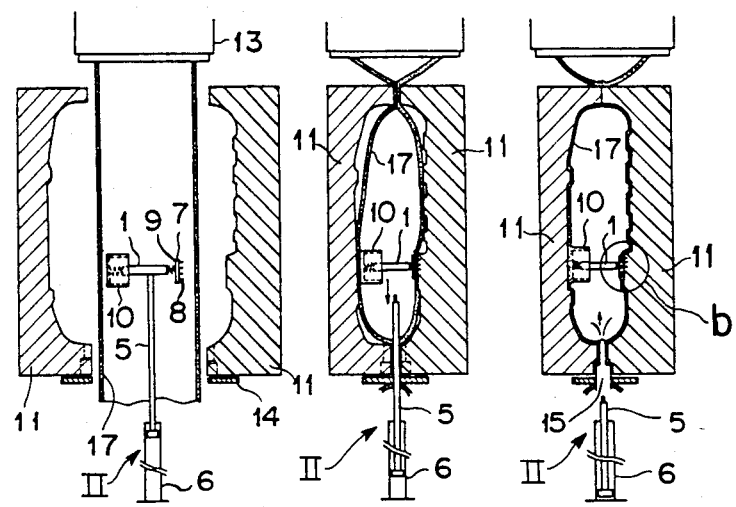
FIGS. 3(A), 3(B) and 3(C) are sectional views used to explain the mode of operation of the preferred embodiment.

The chamber 10 is made into engagement with the chamber holder 1 through the slide cap 2 which is fitted into a corresponding recess of the chamber 10 and the molded plastic insert 9, through the slide cap 2' which is fitted into a corresponding recess of the insert 9. The chamber 10, the insert ring 7, the bolts 8 and the molded plastic insert 9 are extended outwardly from the ends of the chamber holder 1 under the forces of the springs 4. The chamber holder 1 has a maximum length when the slide caps 2 and 2' are made into engagement with the stoppers 3. As shown in FIG. 3(A), the length of the chamber holder 1 is shorter than the diameter of a parison 17 so that the inner supporting device I can be located within the parison 17 without interrupting the extrusion of the parison 17 into the mold 11. The inner supporting device I is extendable beyond the width of the gasoline tank or blow-molded product (that is, the distance between the tank wall 12 on the side of the chamber 10 and the tank wall 12 on the side of the insert ring 7, the bolts 8 and the molded plastic insert 9). Furthermore, the size of the inner supporting device I in the directions perpendicular to the axis of the chamber rod 1 thereof (the vertical direction of FIG. 1 and the direction at right angles to the plane of FIG. 1) is so selected that the inner supporting device I can be inserted into the chamber 10 as shown in FIG. 2.

Next referring to FIGS. 3(A) to 3(C), the blow molding process will be described. First, as shown in FIG. 3(A), chamber holder 1 which supports the chamber 10 and the insert ring 7 is supported by the supporting rod 5 of the outer supporting device II and is placed in position within the parison 17. Upon completion of the extrusion of the parison 17 from a head 13, the lower end of the parison 17 is closed by a prepinch device 14 for moving the mold halves toward each other. Immediately before the mold 11 is closed as shown in FIG. 3(B), the chamber 10 and insert ring 7 supported at both ends of the inner supporting device I force the parison 17 against the cavity surface of the mold 11 and then the mold 11 is closed as shown in FIG. 3(B) so that the chamber holder 1 is supported between the opposite inner surfaces of the parison 17 which becomes the tank walls. In the state as shown in FIG. 3(B), the distance between the mold halves and the distance between the pinch portions of the prepinch device 14 are slightly greater than the diameter of the supporting rod 5 enough for the supporting rod 5 to be withdrawn out of the mold cavity. The cylinder 6 of the outer supporting device II is retracted to disengage the leading or top end of the supporting rod 5 from the engaging hole 1a of the chamber holder 1 and to withdraw the supporting rod 5 out of the mold cavity as shown in FIG. 3(C). In this case, under the forces of the springs 4, the inner supporting device I is extended to and supported by the inner surface of the tank so that the inner supporting device I remains at the same position even when the supporting rod 5 is withdrawn out of the mold cavity as shown in FIG. 3(C). When the mold 11 has been completely closed, the compressed air is blown into the parison 17 through an air blowing pin 15. Meanwhile, the bolts 8 secured to the insert ring 7 which in turn is supported at the other end of the chamber holder 1 break the wall of the parison 17 and are inserted into bolt receiving holes 11a of the mold half so that the insert ring 7 is securely held between the molded plastic insert 9 and the tank wall 12 of the parison 17. During the blow molding process, the chamber 10, the insert ring 7, the bolts 8 and the molded plastic insert 9 are satisfactorily pressed against the parison 17 under the forces of the springs 4 of the inner supporting device I so that they are embedded in the parison 17 and welded thereto. Thus, welding can be accomplished in a very satisfactory manner.

The chamber holder 1 which remains in the tank thus molded must be removed out of the molded tank. This is effected using a gasoline charging opening which is generally formed through the wall of the gasoline tank immediately above the chamber 10. That is, after the gasoline charging opening has been formed on the molded tank, the chamber holder 1 can be removed out of the gasoline tank through this gasoline charging opening. As shown in FIG. 1, even when the chamber holder 1 has a small diameter, it can satisfactorily accomplish its function. As a result, as compared with the conventional method in which an opening is formed through the wall of a blow-molded gasoline tank main body so as to insert a chamber therein, the gasoline charging opening can be reduced in diameter one half less than the chamber insertion opening.

Figure 4:
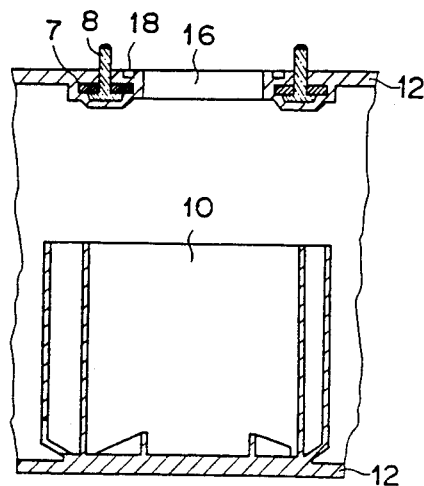
FIG. 4 is a sectional view of a molded product in the form of a reservoir or chamber and disposed as an insert within a gasoline tank.

FIG. 4 is a partial sectional view of the gasoline tank after the chamber holder 1 has been removed through an opening 16 which can be used as a gasoline charging opening. A groove 18 adapted to receive an O-ring therein is formed around the opening 16.

Figures 5A, 5B, 6:
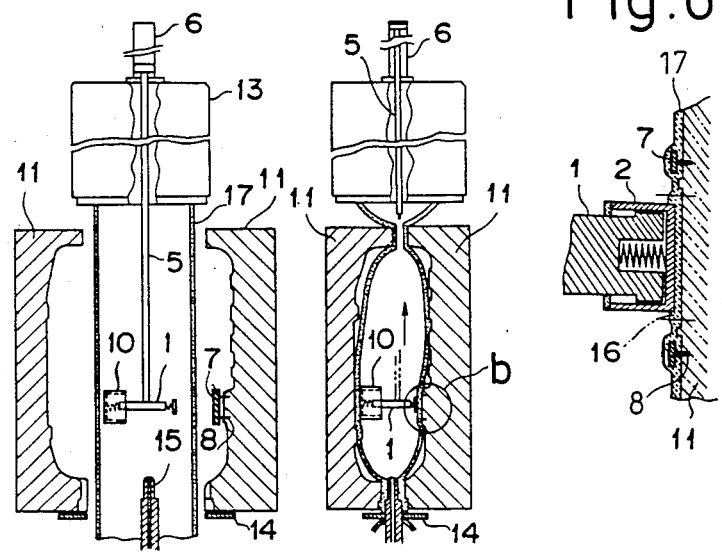
FIGS. 5(A) and 5(B) are sectional views used to explain the mode of operation of another embodiment of the present invention.
FIG. 6 is a sectional view, on enlarged scale, of a portion encircled by a circle b in FIG. 3(C) or FIG. 5(B).

FIGS. 5(A) and 5(B) illustrate a second embodiment of the present invention which is substantially similar to the first embodiment described above with reference to FIGS. 3(A), 3(B) and 3(C) except the features to be described below. That is, the insert ring 7 and bolts 8 are attached as outer inserts to the cavity surface of the mold 11 as shown in FIG. 5(A). The insert ring 7 is spaced apart from the cavity surface of the mold 11 by some distance so that it is embedded into the parison 17. The chamber 10 is supported at one end of the chamber holder 1 which is located in position within the parison 17 by means of the supporting rod 5 which in turn is depending from the cylinder 6 mounted at a position above the mold 11.

In the second embodiment, the compressed air is blown into the parison 17 after the mold 11 has been completely closed as shown in FIG. 5(B). Then the outer inserts or insert ring 7 and bolts 8 are embedded into and formed integral with the parison 17 as best shown in FIG. 6.

As described above, according to the present invention, an inner insert or inserts are supported by one end or both ends of the inner supporting device which is disposed within a parison and which is extendable beyond the width of a blow-molded product. The inner supporting device is inserted into a parison through an opening thereof and is located in position within the parison by means of the outer supporting device. Thereafter the mold halves are closed and the parison is clamped by the mold halves. When the insert is made into contact with the cavity surface through the parison, the outer supporting device is disengaged from the inner supporting device and is removed out of the mold cavity. Thereafter the mold is completely closed and the compressed air is blown into the parison so that the insert is welded to the blow-molded product. Therefore, when the blow-molded product is removed out of the mold cavity, the inner insert is securely welded to the blow-molded product. As a result, the quality of the blow-molded products can be improved and the steps required after the blow molding step can be substantially eliminated so that the costs of the blow-molded products can be considerably reduced. No separate storage of inner inserts during blow molding operation is needed so that the space required for storage and the working space can be reduced. In addition, the size of the inner supporting device in the direction perpendicular to the direction in which the inner supporting device is extendable is small so that an opening which must be formed through the wall of the blow-molded product so as to remove the inner supporting device out of the blow-molded product can be reduced in diameter. As a consequence, the strength of the blow-molded product can be satisfactorily maintained and it becomes easy to seal the blow-molded product.

What is claimed is:

1. A method for disposing an inner insert in blow molding comprising:
    providing a pair of movable molds which have inner surfaces and which are movable toward each other to have the inner surfaces thereof form a closed molding chamber;
    providing a head from which a parison can be extruded between the molds;
    providing an inner supporting device;
    adapting the inner supporting device to have a dimension that is extendable and contractable;
    biasing the ends of the inner supporting device extendably to have a length dimension greater than the spacing between the molds when such molds are closed with the spacing being at a predetermined location in the molding chamber;
    releasably positioning an inner insert on one end of the inner supporting device;
    releasably mounting the inner supporting device on an outer supporting device;
    moving the outer supporting device with the inner supporting device and inner insert thereon into a position between the molds so that the inner supporting device is at a predetermined location between the molds with its biasedly extended dimension transverse to the mold inner surfaces;
    extruding a parison between the molds and between the molds and the inner supporting device and inner insert;
    after completion of the parison extrusion, moving the molds toward each other;
    forcing the mold inner surfaces against the parison and forcing such parison against the inner insert on the extendably biased inner supporting device;
    causing the inner supporting device to contract against the bias therein and causing the inner insert on the biasedly extended inner supporting device to be held in position against the parison;
    withdrawing the outer supporting device from the parison;
    closing the parison;
    blowing compressed air into the parison in the closed mold chamber after the mold has been completely closed to form a blow molded product;
    embedding the inner insert into the parison and securely welding that insert to the blow molded product being formed in the closed chamber; and
    withdrawing the inner supporting device from the blow molded product.

2. A method according to claim 1 further including steps of supporting another insert by the other end of said inner supporting device and biasing such another insert outwardly away from the first-mentioned inner insert.

3. A method according to claim 1 further including a step of attaching another insert to a cavity surface of said mold prior to the blowing step.

4. The method according to claim 1 wherein the step of withdrawing the inner supporting device from the blow molded product includes forming a hole in that blow molded product.

* * * * *